(12) United States Patent
Niu et al.

(10) Patent No.: US 10,793,372 B2
(45) Date of Patent: Oct. 6, 2020

(54) CONTROL DEVICE, CONVEYOR FOR TRANSPORTING PRODUCTS, AND METHOD FOR CONTROLLING A CONVEYOR FOR TRANSPORTING

(71) Applicant: Interroll Holding AG, Sant' Antonino (CH)

(72) Inventors: Huiping Niu, Moenchengladbach (DE); Normen Theis, Durmersheim (DE)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 16/619,117

(22) PCT Filed: Jun. 8, 2018

(86) PCT No.: PCT/EP2018/065141
§ 371 (c)(1),
(2) Date: Dec. 4, 2019

(87) PCT Pub. No.: WO2018/224643
PCT Pub. Date: Dec. 13, 2018

(65) Prior Publication Data
US 2020/0095066 A1 Mar. 26, 2020

(30) Foreign Application Priority Data

Jun. 9, 2017 (DE) .......................... 10 2017 005 494
Aug. 22, 2017 (DE) .......................... 10 2017 007 923

(51) Int. Cl.
*B65G 43/08* (2006.01)
*B65G 13/06* (2006.01)
(Continued)

(52) U.S. Cl.
CPC ............. *B65G 43/08* (2013.01); *B65G 13/06* (2013.01); *B65G 13/075* (2013.01); *B65G 43/00* (2013.01);
(Continued)

(58) Field of Classification Search
CPC ........ B65G 43/00; B65G 43/02; B65G 43/10; B65G 13/06; B65G 13/075; B65G 43/08;
(Continued)

(56) References Cited

U.S. PATENT DOCUMENTS 6,047,812 A 4/2000 Horn et al.
2010/0294625 A1* 11/2010 Wolkerstorfer ......... F16D 37/02
198/575

(Continued)

FOREIGN PATENT DOCUMENTS

DE 102 57 466 7/2004
EP 2 192 685 6/2010
(Continued)

OTHER PUBLICATIONS

German Office Action dated May 25, 2018.
(Continued)

*Primary Examiner* — Mark A Deuble
(74) *Attorney, Agent, or Firm* — Gerald E. Hespos; Michael J. Porco; Matthew T. Hespos

(57) ABSTRACT

A control device (1) for a goods transport conveyor (100) has a processor (10) that generates control signals for at least one drive motor (350) of a transport section (110; 120; 130) of the goods transport conveyor (100). The motor operates in stop-and-go mode. The processor (10) is configured to
(Continued)

control the drive motor (350) by means of a forward phase and/or reverse phase when the transport section (110; 120; 130) of the goods transport conveyor (100) stops such that the torque (M(t)) produced by the drive motor (350) is reduced according to an adjustable stopping function. The processor (10) sets the stopping function depending on detected process data of the transport section (110; 120; 130).

19 Claims, 7 Drawing Sheets

(51) Int. Cl.
*B65G 13/075* (2006.01)
*H02P 3/20* (2006.01)
*B65G 43/00* (2006.01)

(52) U.S. Cl.
CPC .......... *H02P 3/20* (2013.01); *B65G 2203/045* (2013.01); *B65G 2811/097* (2013.01)

(58) Field of Classification Search
CPC .............. B65G 23/08; B65G 2203/045; B65G 2811/097; H02P 7/295; H02P 3/18; H02P 3/20
See application file for complete search history.

(56) References Cited

U.S. PATENT DOCUMENTS

| | | | |
|---|---|---|---|
| 2012/0290126 A1* | 11/2012 | Combs | B65G 23/08 700/230 |
| 2015/0353283 A1* | 12/2015 | Harms | H02P 25/02 318/801 |
| 2018/0237226 A1* | 8/2018 | Kacel | B65G 13/06 |
| 2019/0233216 A1* | 8/2019 | Van Holthe Tot Echten | B65G 23/08 |

FOREIGN PATENT DOCUMENTS

| | | |
|---|---|---|
| EP | 2 623 440 | 8/2013 |
| JP | 4-119408 | 4/1992 |

OTHER PUBLICATIONS

International Search Report dated Oct. 16, 2018.
Randermann—Eaton Corporation Electrical Sector—Starten and steuem von Drehstrom-Asynchronmotoren, 2010.
Eaton Corporation Electrical Sector—EMA—Corrected Edition 2011.

\* cited by examiner

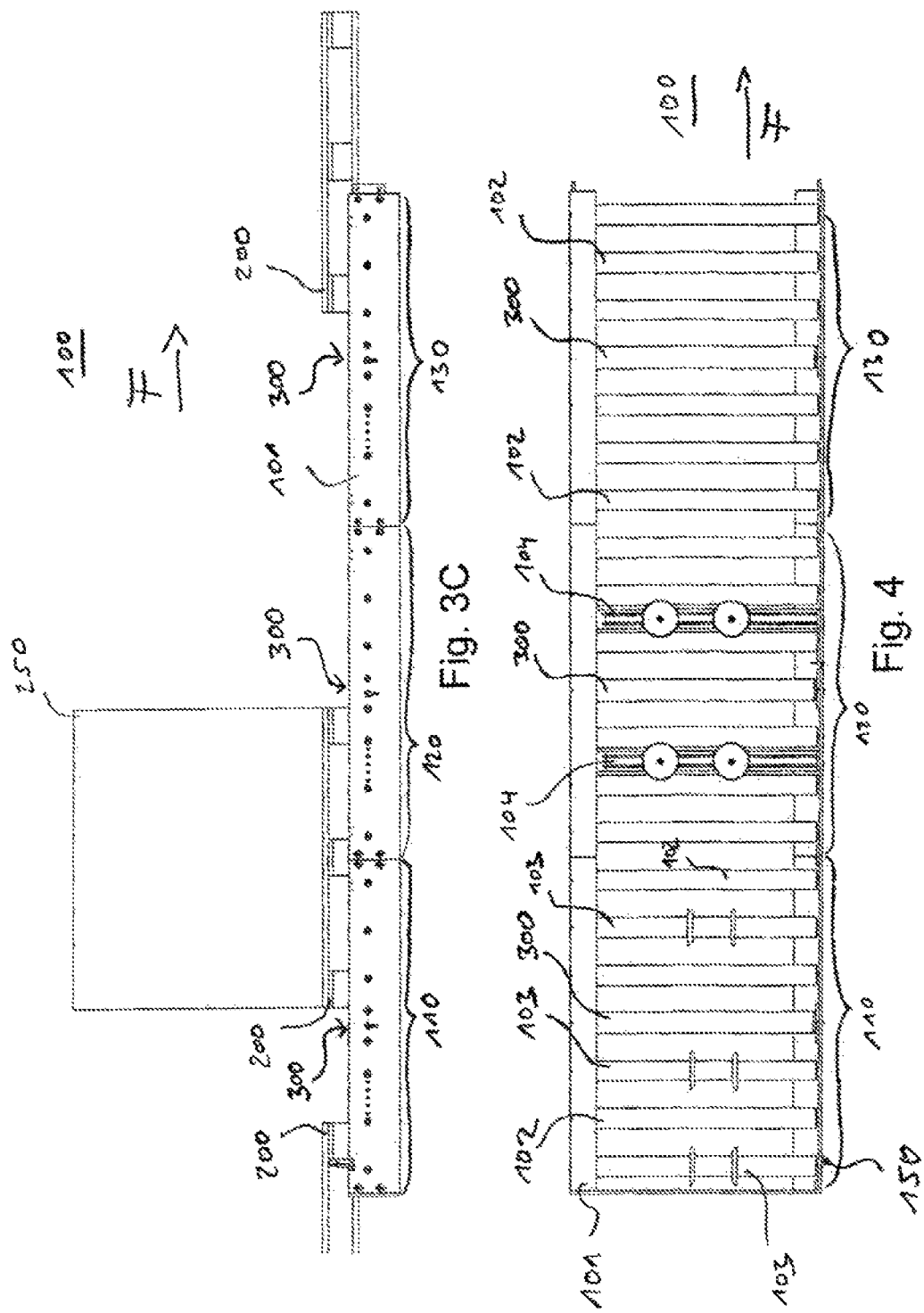

CONTROL DEVICE, CONVEYOR FOR TRANSPORTING PRODUCTS, AND METHOD FOR CONTROLLING A CONVEYOR FOR TRANSPORTING

BACKGROUND

Field of the Invention

The invention relates to a control device for a conveyor for transporting products, to a conveyor for transporting products, and to a method for controlling a conveyor for transporting products.

Related Art

Conveyors for transporting products are used to convey transported products along a predetermined transport path. Conveyors for transporting products can comprise a plurality of transport sections into which the transport path is divided. The transported products can be conveyed along the individual transport sections in a stop-and-go mode. This means that some of the individual transport sections are driven, so that they can further convey transported products located thereon, and some are at a standstill, so that transported products located thereon are not conveyed further.

The stop-and-go mode can serve to adjust and/or create distances between individual transported products. For example, the conveyor for transporting products can be configured such that a transported product is conveyed from a first transport section to a following second transport section only when the following second transport section is free of transported products. As long as there is still a transported product in the following transport section, the preceding, first transport section is stopped, as is the transported product located thereon.

Such a conveyor for transporting products can convey, for example, pallets and transported products arranged thereon, that is to say can be in the form of a pallet conveyor.

The transport sections of the conveyor for transporting products can each be driven by at least one drive motor. The drive motor can in particular drive a drive roller or be in the form of a drive roller.

The object underlying the invention is to permit improved control of a conveyor for transporting products, in particular to permit improved position control of the conveyed transported products.

SUMMARY

One aspect relates to a control device for a conveyor for transporting products having a processor that generates control signals for at least one drive motor of a transport section of the conveyor for transporting products. The at least one drive motor that is operated in stop-and-go mode. The processor is configured, on stopping of the transport section of the conveyor for transporting products, to control the drive motor by means of a phase-cut on and/or phase-cut off in such a manner that the torque generated by the drive motor is reduced in accordance with an adjustable stop function. The processor adjusts the stop function in dependence on detected process data of the transport section.

The control device is provided for the conveyor for transporting products, and the conveyor can be in the form of a pallet conveyor. The conveyor for transporting products comprises the at least one transport section, but preferably comprises a plurality of transport sections arranged one behind the other. The transport sections together form a transport path of the conveyor for transporting products, along which the transported products are transported.

The conveyor for transporting products can be configured to control individual transport sections individually and differently and to operate them in the stop-and-go mode described hereinbefore. As a result of the stop-and-go mode, distances between the transported products can be adjusted and/or created.

The transport section is driven by the at least one drive motor. The transport section can also be driven by plural drive motors that are controlled by the control device, for example, simultaneously. The drive motor can in particular be the drive motor of a drive roller that can be arranged in the transport section as a conveying roller. The drive motor can, for example, be in the form of a drum motor that comprises, for example, a squirrel-cage rotor and/or other asynchronous motor. The transport section can comprise plural rollers that are connected to the at least one drive roller such that the drive motor drives and/or stops (i.e. brakes) substantially all the rollers of the transport section. Alternatively, the transport section can also comprise a conveyor belt that is driven by the drive motor.

The control device comprises a processor that can be in the form of a microprocessor and/or in the form of a processor of a computer. The processor is configured and provided to generate and provide the control signals for the at least one drive motor. The processor is thus capable of controlling and/or regulating the drive motor, in particular of controlling it in the stop-and-go mode.

For generating the control signals, the processor can additionally use at least one signal and/or data and/or at least one current supply and/or at least one voltage supply. For example, the processor can obtain, by means of a detector, information about the times at which the transport section (and thus the drive motor) is to be driven and the times at which it is to be stopped. Such a detector can comprise a light barrier, for example, that transmits to the processor data regarding the time at which a following transport section is occupied or is free.

The processor is configured to accelerate and/or brake the transported products transported along the transport section by means of a phase-cut on and/or phase-cut off. An initial torque of electric drive motors can be reduced by a forward or phase-cut off that increases over time. Phase-cut on and/or phase-cut off controllers can thereby control the drive motor of the conveyor for transporting products in such a manner that the drive motor is driven from a non-driven state initially with reduced power, so that the drive motor can start up gently significantly below full load. This reduces the risk of tipping or load distortion as a result of displacement of transported products which are being conveyed on the transport section.

The control device uses the phase-cut on and/or phase-cut off not only when starting the transport section and also may be used when stopping the transport section. The torque of the drive motor is not braked directly from the full nominal power (that is to say from the operating torque) to, for example, zero, but gradually (e.g. continuously or in individual steps) during a certain stopping period. The risk of tipping or load distortion as a result of displacement of the transported products is thus also reduced when the transport section is stopped.

As a result of the phase-cut on and/or phase-cut off, the torque generated by the drive motor is increased during a starting period on starting of the transport section, for example from a reduced starting torque to the operating torque, which is also called the nominal load torque. The increase can take place, for example, linearly and/or substantially constantly and/or in individual steps. In this case, it is also possible to speak of a start ramp, along which the torque of the drive motor is increased. Under full load, the drive motor can be operated such that the transport section is driven with the substantially constant operating torque of the drive motor.

Also when stopping the drive motor, the torque generated by the drive motor is reduced by a phase-cut on and/or phase-cut off from the full operating torque to, for example, zero or a stopping torque other than zero. The reduction of the torque can take place during a stopping period during which the torque generated is reduced increasingly further, for example constantly and/or linearly. In this case, it is also possible to speak of a stop ramp, along which the torque of the drive motor is reduced.

Stopping of the drive motor is controlled by the processor in such a way that that the torque generated by the drive motor is reduced in accordance with the stop function. The stop function can be, for example, a function of the torque over time. The torque is initially the operating or nominal load torque that is reduced increasingly further during the stopping period and, at the end of the stopping period, is zero, for example, or corresponds to a stopping torque. The stop function can in particular be a decreasing function, for example a monotonically decreasing function, during which the torque is reduced, for example, linearly and/or stepwise.

It has been found that some processes and/or conditions of the transport section can influence how quickly the conveyed transported product can be stopped. These processes and/or conditions can thus influence the stopping distance of the transported product conveyed on the transport section. To track the transported products, it is important how quickly and over what stopping distance the individual transported products can be stopped, for example, to ensure that they are not yet conveyed into the following transport section. Depending on the exact process and/or the conditions, different stopping distances can arise when the transported products conveyed along the transport sections are stopped, which stopping distances can differ from one another by several centimeters, in particular in the two-figure centimeter range.

Some of the processes and/or conditions of the transport section can be expressed at least in part in the process data. To control and/or adjust the position of the individual transported products better, the processor can take into consideration relevant process data of the transport section. The process data can be current measured process data and/or individual process data. Current measured process data are data that have been detected only shortly before use and/or consideration by the processor, that is to say, for example, within a predetermined period of, for example, less than one minute, preferably of less than one second, before consideration by the processor. Individual process data can relate to specific process data of the controlled transport section, including specific information about the transported product currently being conveyed on the transport section, such as, for example, weight, center of gravity, etc.

The processor is configured to take these process data into consideration and to adjust the stop function accordingly. If the stop function corresponds substantially to an approximately linearly decreasing function (corresponding to a stop ramp), the negative gradient and thus the length of the stop ramp, for example, can be adjusted, that is to say the duration of the negative gradient until complete stop. The processor can, for example, adjust the stopping period during which the torque is reduced from the operating torque to the stopping torque. The adjustment of the stop function can be made on the basis of parameters that can be stored in a memory means of the control device. The adjustment can thus be based in particular on parameters that are stored beforehand in a memory means of the control device.

Control of the position of the transported products can thereby be improved, since the stopping distances can be adjusted and/or influenced individually.

The processor can be configured to take into consideration current and/or individual process data at each individual stopping procedure.

According to one embodiment, the stop function is a time-dependent function of the torque of the drive motor. The torque of the drive motor can be controlled via the phase-cut on and/or the phase-cut off. In particular, the size of the torque can be adjusted by the processor by means of the phase-cut on and/or phase-cut off. In dependence on the detected process data, the stop function that is suitable for the detected process data can be selected depending on the detected process data. In particular, it is also possible to use a single stop function that is parameterized in dependence on the detected process data. In other words, the processor, in dependence on the detected process data, can select at least one parameter of the stop function that changes and/or influences the time-dependent function of the torque. In particular, a predetermined stopping period can be adjusted, that is to say the period during which the torque is reduced from the operating torque to zero. The stopping period can also be defined as the period during which the torque is reduced from the operating torque to the stopping torque. The stopping torque does not necessarily have to correspond to zero but can, for example, be smaller than or equal to a start-up torque. Furthermore, the amount and/or the direction of the stopping torque can also be adjustable and/or adjusted, for example by parameters of the stop function.

According to one embodiment, the processor adjusts a stopping period, during which the torque of the drive motor is reduced from an operating torque to a stopping torque, in dependence on the detected process data. The stopping period can be a parameter of the stop function and can be adapted to the detected process data. The stopping torque can, for example, be zero, or can correspond to a start-up torque. In general, the stopping torque can be not equal to zero, in particular smaller than the start-up torque with which the drive motor is started.

According to one embodiment, the processor adjusts the stopping torque, to which the torque of the drive motor is reduced on stopping, in dependence on the detected process data.

In one exemplary embodiment, the detected process data include information about a current operating temperature and/or information about a transported product weight of a transported product transported along the conveyor for transporting products. The operating temperature can in particular be the operating temperature of the drive motor, which influences the stopping distance on stopping of the transport section. Alternatively, or in addition, the process data can include information about transported product weight. They can contain in particular information about the transported product weight of the transported product transported along the transport section that is driven by the at least one drive motor. The transported product weight can also influence the stopping distance on stopping of the transported product or of the transport section. The transported product weight and the operating temperature are two different process data that noticeably influence the stopping distance. The operating temperature of the drive motor can be an important process parameter that influences the stopping distance to an even greater extent than the weight of the transported product. However, this is the case only in normal cases. Since in most cases transported products of a relatively similar transported product weight are transported, the transported product weight tends to play a secondary role in normal cases. In these cases, it can be sufficient to take into consideration as process data only the operating temperature of the drive motor. In other cases, in which transported products of very different transported product weights are being transported along the conveyor for transporting products, it can be expedient, or even lead on its own to improved control and/or position control, additionally or alternatively to take into consideration the transported product weight as process data.

According to one embodiment, the processor takes into consideration the operating temperature of the drive motor as process data when adjusting the stop function. The currently measured operating temperature of the drive motor in particular can be taken into consideration, that is to say the operating temperature that was measured directly before consideration by the processor, for example not more than one minute ago, preferably not more than one second ago. The process data do not have to contain the operating temperature of the drive motor directly as a value, for example in degrees Kelvin or degrees Celsius. The process data can also merely include information about the operating temperature, that is to say contain the operating temperature only indirectly. Such indirect information can be, for example, the electrical resistance of a component having the operating temperature of the drive motor, or the like. Furthermore, the exactly measured operating temperature of the drive motor does not necessarily have to be used. Instead, an estimated operating temperature can be used as the process data, which temperature differs, for example, by not more than approximately 10%, preferably by not more than approximately 5%, from the actual operating temperature.

In a further development of this embodiment, the processor generates control signals for the drive motor of a drive roller of the transport section, and the operating temperature of the drive motor is determined by establishing the temperature-dependent electrical resistance of a holding brake of the drive roller. The holding brake can be a component of the conveyor for transporting products that already is installed in the drive roller. An additional temperature sensor thus is not required. Determining the temperature-dependent electrical resistance of the drive motor directly can be technically laborious. Thus, the operating temperature is determined indirectly. During operation of the drive motor, at least one phase of an alternating voltage is present at the drive motor, which makes it difficult to measure the temperature-dependent electrical resistance of the windings of the drive motor. The holding brake, however, can have substantially the same operating temperature as the drive motor when it is configured as the holding brake for the same drive roller. The holding brake can be configured such that, in the unpowered state, the holding brake brakes the driven roller. If a current and/or a voltage is present at the holding brake, then the braking action is reduced and/or removed, so that the drive roller can be driven by the drive motor. A smaller voltage can be present at the holding brake than at the drive motor, for example 24 V at the holding brake and 400 V at the drive motor. For this reason too, it can be easier to measure the electrical resistance at the holding brake than to measure electrical resistance of the windings of the drive motor. The operating temperature of the holding brake serves as a measure and/or estimate of the operating temperature of the drive motor.

Instead of the operating temperature of the holding brake, the temperature of another component of the drive roller can be measured and used. Preferably, this other component of the drive roller is arranged at least in part inside the roller covering and/or is coupled thermally with the drive motor.

In a further development of this embodiment, the holding brake is arranged adjacent to the drive motor on a stationary shaft of the drive roller. The stationary shaft can be in temperature exchange both with the holding brake and with the drive motor. Thus, when the temperature of the holding brake is measured, the operating temperature of the drive motor also is measured indirectly.

In an additional or alternative further development of this embodiment, the holding brake is operated with a smaller operating voltage than the drive motor. For example, the holding brake can be operated by a 24 V operating voltage and the drive motor with at least one phase of a 400 V operating voltage. In addition, the drive motor can be operated by means of an alternating voltage and the holding brake by means of a direct voltage. Therefore, measurement of the temperature-dependent electrical resistance of the holding brake can be technically simpler to carry out than direct measurement of the operating temperature of the drive motor.

According to one embodiment, the processor, when adjusting the stop function, takes into consideration as process data a transported product weight of a transported product being conveyed on the conveyor for transporting products. The transported product weight can be detected by a weight sensor and transmitted to the processor. The transported product weight can be contained directly or indirectly in the process data, for example only information about the transported product weight can be contained in the process data, from which the transported product weight can be determined. The transported product weight can have an influence on the stopping distance of the transported product. Thus, consideration of the transported product weight can have a significant influence on the selection and adjustment of the suitable stop function.

According to one embodiment, the processor is configured to determine information about a transported product weight of a transported product conveyed on the conveyor for transporting products from the electrical power that is required on start-up of the drive motor in order to accelerate the transported product to a desired speed. For example, on start-up of the transport section, the processor can record and/or measure the acceleration power that is required to accelerate the transported product to its desired speed. The transported product can then reach the desired speed when the drive motor works with its operating torque. The electrical power required for acceleration can include information about the transported product weight. From that information, the transported product weight, for example, can also be determined directly. It is thereby also possible for only a part of the electrical (acceleration) power required therefor to be used, for example the power fraction up to acceleration to half the desired speed, the power fraction for acceleration from half the desired speed to the full desired speed, etc. The information about the transported product weight that is determined by the processor can be stored, for example, in a memory means of the control device and/or outputted to the processor of a control device of a following transport section. The processor of the following transport section can use the information as process data when the following transport section receives the transported product and is to bring it to a stop. The control device can be configured to generate the control signals for a plurality of drive motors of different transport sections. In this case, the processor of the control device can itself optionally use the measured transported product weight at a later point in time, namely when it is to bring to a stop a following transport section on which the previously accelerated transported product is being conveyed.

According to one embodiment, the control device comprises at least one sensor data input via which the processor receives the detected process data of the conveyor for transporting products at least in part. For example, the sensor data input can be connected to the processor of a control device of a preceding transport section. In addition and/or alternatively, the sensor data input can be connected to a process data sensor, for example a temperature sensor and/or a weight sensor for measuring the operating temperature of the drive motor or the weight of the transported product.

According to one embodiment, the control device comprises at least one control output for outputting the control signals to the at least one drive motor of the conveyor for transporting products. The control signals can directly contain the drive signals with the phase-cut on and/or phase-cut off, that is to say the direct control signals together with the necessary supply power. Alternatively, the control devices among one another and/or the control devices with the drive motors can transmit the signals via a data BUS line, for example a CAN bus, which stands for controller area network bus.

In a further development of this embodiment, the control device comprises a supply input for a supply voltage with at least one phase, preferably with three phases. The processor provides the at least one phase of the supply voltage as a control signal at the control output so that, on start-up and stopping of the drive motor, is it provided with a phase-cut on and/or a phase-cut off. In other words, the processor generates the control signals that can be used directly by the drive motor, together with the supply voltage for operating, stopping and starting the drive motor. The phase-cut on and/or phase-cut off for stopping the drive motor is changed and/or shaped by means of the adjusted stop function.

In a further development of this embodiment, the control output is configured in two parts for outputting two control signals for controlling two drive motors of the conveyor for transporting products. The processor generates the two control signals from the same supply voltage, which is present at the supply input. In other words, the processor uses the supply voltage for two drive motors, for example for at least two drive motors. The two drive motors can be, for example, the two drive motors of the same transport section. Preferably, however, the two drive motors are the drive motors of different, for example adjacent, transport sections. Thus, each of the transport sections can comprise its own drive motor which is controlled by the same processor of the control device. The control device can also be configured to generate and output the control signals of more than two drive motors that drive more than two different transport sections.

According to one embodiment, the control device comprises a signal input via which input signals can be transmitted to the processor. The input signals include information about start times and stop times of the at least one drive motor. The processor is configured to generate the control signals for the at least one drive motor at the transmitted start times and stop times, so that the drive motor is started and stopped by means of a phase-cut on and/or phase-cut off. In other words, the processor receives input signals via the signal input which inform the processor when the at least one drive motor is to be started and when it is to be stopped. However, these start times do not as yet contain a phase cut or exact control signals for controlling the drive motor. Instead, the processor converts the input signals such that it generates from the information about the start times and stop times exact control signals for controlling the drive motor, in particular control signals including the supply voltage for the drive motor. In other words, the processor can control and/or regulate the torque generated by the drive motor.

According to one embodiment, the processor generates control signals for the drive motor of a pallet conveyor as the conveyor for transporting products. A pallet conveyor conveys standard pallets on which the goods and/or transported products are arranged. Pallets have a predefined size and can therefore be conveyed in a particularly advantageous and controlled manner on the pallet conveyor.

One aspect relates to a conveyor for transporting products having at least one transport section that is driven by at least one drive motor, and a control device according to the aspect described hereinbefore, wherein the control device outputs control signals generated by the processor of the control device to the at least one drive motor. The conveyor for transporting products can also comprise plural transport sections that can be controlled individually. Each transport section may comprise at least one drive motor that is controlled via a control device. Either each drive motor can be controlled by its own control device, or the control device can control a plurality, in particular all, of the drive motors. The control device controls each transport section in such a manner that it takes into consideration and/or uses detected process data of the specific transport section for adjusting the respective stop function. The individual transport sections can be arranged one behind the other along a conveyor path. The transported products are transferred from one transport section to the next transport section. The individual transport sections work in stop-and-go mode, that is to say they are repeatedly driven and stopped.

According to one exemplary embodiment, the conveyor for transporting products comprises a temperature sensor for detecting the operating temperature of the at least one drive motor, wherein the temperature sensor provides information about the detected operating temperature to the processor of the control device as process data. There can be used as the temperature sensor in particular a holding brake that is in heat exchange with the drive motor.

One aspect relates to a method for controlling a conveyor for transporting products, wherein:
- operating at least one drive motor of a transport section of the conveyor for transporting products in a stop-and-go mode;
- detecting and providing process data of the transport section and provided;
- stopping the transport section of the conveyor for transporting products, controlling the at least one drive motor by a phase-cut on and/or phase-cut off in such a way that the torque generated by the drive motor is reduced in accordance with an adjustable stop function; and
- adjusting the stop function in dependence on the detected process data.

The method can be carried out in particular by means of a control device and/or on a conveyor for transporting products according to the aspects described hereinbefore. Therefore, all the features and/or embodiments described hereinbefore also apply to the method according to this aspect and vice versa.

Within the context of this invention, the expressions "substantially" and/or "approximately" can be used such that they include a deviation of up to 5% from a numerical value following the expression, a deviation of up to 5° from a direction following the expression and/or from an angle following the expression.

Expressions such as top, bottom, above, below, etc. relate—unless specified otherwise—to the earth's reference system in an operating position of the subject-matter of the invention.

The invention will be described in greater detail herein below with reference to exemplary embodiments shown in figures. The same or similar reference characters can here denote the same or similar features of the embodiments. Individual features shown in the figures can be implemented in other exemplary embodiments.

BRIEF DESCRIPTION OF THE DRAWINGS

FIG. 3C shows, in a side view, the three transport sections of the pallet conveyor;

FIG. 4 shows, in a view from above, three transport sections of a pallet conveyor without pallets.

DETAILED DESCRIPTION

Figure 1:
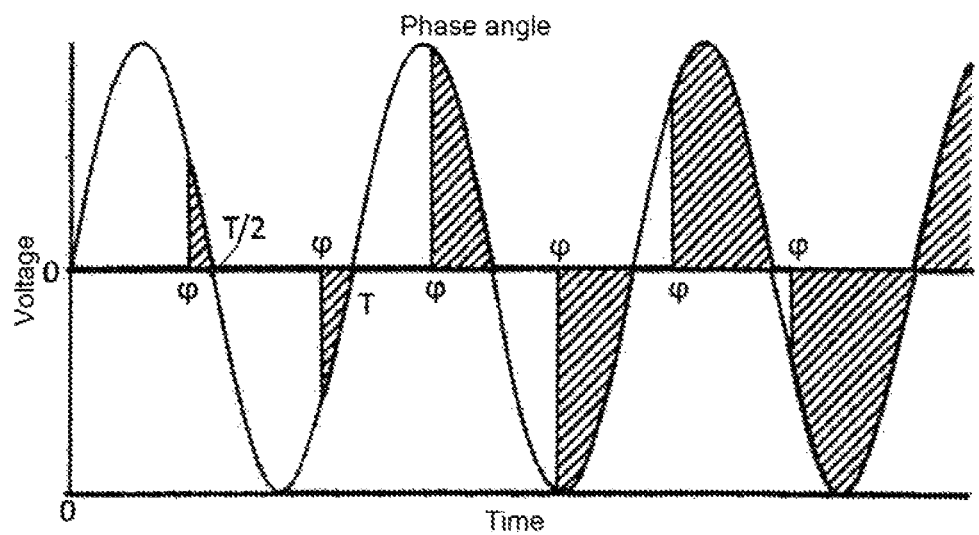
FIG. 1 shows in a diagram the effect of a reverse phase control.

FIG. 1 shows, in a diagram, the method of operation of a reverse phase control. The diagram shows the voltage characteristic of an alternating voltage, which is approximately sinusoidal, plotted over time. The voltage can be, for example, a typical alternating voltage which is provided by the, for example, single-phase electricity network. In order to effect, for example, a gentle start-up of the conveyor for transporting products, a reverse phase control cuts off a portion of the phase of the voltage shown in order to accelerate a transport section of the conveyor for transporting products. The reverse phase control thus actually applies the voltage to a drive motor of the conveyor for transporting products only in parts of the phases.

In the case of a period duration T, voltage could be applied to the drive motor during a first sine curve of the alternating voltage, which is shown directly adjacent to the zero point in the diagram, from time 0 to time T/2. During this period, however, the reverse phase control "cuts" this voltage "off" for a large part of the time between 0 and T/2 and applies the voltage to the drive motor only towards the end of the first sine curve shown.

In the diagram shown, the periods in which the reverse phase control applies voltage to the drive motor of, for example, a conveyor for transporting products are marked by a hatched area between the sinusoidal voltage and the neutral axis of the voltage. If said area is not filled, that is to say shown in white, the reverse phase control "cuts" the voltage "off", that is to say does not apply the voltage to the drive motor.

During the first, positive sinusoidal voltage curve (that is to say in the period from 0 to T/2), the reverse phase control allows the voltage "through" only for the last approximately 15% of the associated time span of T/2. This percentage slowly increases from sine curve to sine curve of the alternating voltage, until the reverse phase control applies the full phase and voltage to the drive motor in the case of the sine curve shown on the far right, which is the seventh sine curve in the diagram. It should be noted that the number of sine curves (or actually half-sine curves) is to be understood as being an example. In reality, the reverse phase control will generally allow the full voltage through only at a substantially later time. The number of sine curves to be passed through until the full voltage is applied can be adjustable.

In other words, the reverse phase control applies the voltage to the drive motor only from specific phase angles φ. The reverse phase control applies the voltage to the drive motor only from a certain start-up phase angle φ to the next zero point of the alternating voltage. This start-up phase angle φ can change, for example, from zero point to zero point of the alternating voltage, so that the reverse phase control applies voltage to the drive motor increasingly earlier, until the full voltage is applied to the drive motor. In general, a phase control can be designed such that, in the acceleration per period duration T of the alternating voltage, it applies voltage to the drive motor on average for increasingly longer, until it applies the full voltage.

The method of operation of a forward phase control is similar to that of a reverse phase control. One difference between these two phase controls is that one cuts off the start of a sine curve while the other cuts off the end of a sine curve. Otherwise, the two phase controls, that is to say forward phase control and reverse phase control, have a similar effect. While one phase control applies voltage to the drive motor from a start-up phase angle φ to the zero point, the other applies voltage from a zero point only to an end phase angle. Since the principle of forward phase and/or reverse phase control is known in principle to a person skilled in the art, the method of operation of a forward phase and/or reverse phase control will not be discussed further at this point, but reference may be made in this connection to the relevant specialist literature.

The phase-cut off shown can be used for gradually accelerating a drive motor. Analogously thereto, the drive motor can be stopped by means of the phase-cut off. The start-up phase angle φ, from which the phase is actually applied to the motor, will initially be 0. In other words, in normal operation at, for example, operating torque, the full phase is applied. The start-up phase angle φ gradually increases to the value σ (that is to say exactly the reverse of the reduction shown in FIG. 1). Voltage is then no longer applied to the drive motor at any time, and the drive motor is in standstill.

FIGS. 2A to 2D show, in each case in a diagram, the controlled torque M(t) according to a first, second, third and fourth exemplary embodiment for a start/stop cycle of a drive motor operated in stop-and-go mode. The time t is plotted on the x-axes, and the controlled torque from 0% to 100% of the maximum torque is plotted on the y-axes. The controlled torque M(t) shown in FIGS. 2A to 2D on the y-axes does not have to correspond exactly to the torque that is actually present at the respective time. More precisely, there is shown on the y-axes, in percent, the phase angle and/or the opening angle of the corresponding motor actuator controlled by a control device, in one exemplary embodiment, for example, the opening angle of a TRIACS (abbreviation for "triode for alternating current"). If the conveyor for transporting products, as provided according to one exemplary embodiment, is operated with at least one asynchronous motor, the controlled phase angle does not have to correspond exactly to the torque actually present. Therefore, the diagrams shown in FIGS. 2A to 2D are to be understood as being schematic diagrams in which the controlled phase angle in each case is actually shown on the respective y-axes, which corresponds, however, to a controlled, desired and/or intended torque. The value shown as a percentage can also be referred to as the controlled torque M(t).

In general, the expression "torque" used within the context of this invention can also be understood as meaning "controlled torque" and/or "controlled phase angle". The same applies correspondingly to the expressions "operating torque", "initial torque" and "start-up torque", which can also be understood as meaning "controlled operating phase angle", "controlled initial phase angle" and "controlled start-up phase angle".

Beneath the time axes, a number of times are marked at which the control of the torque of the drive motor is changed. Successive times are marked $t_1$ to $t_5$.

Figure 2A:
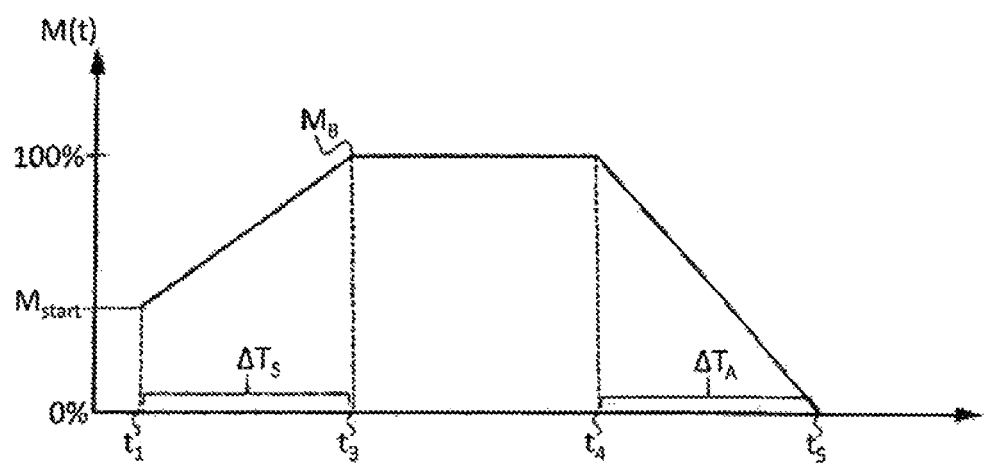
FIG. 2A to 2D show, in each case in a diagram, the controlled torque of a drive motor according to different exemplary embodiments.

In the first exemplary embodiment, which is described with reference to the diagram shown in FIG. 2A, a start signal for driving the drive motor is generated at the first time $t_1$. At the first time $t_1$, the drive motor is driven with a start-up torque $M_{start}$ which can be, for example, approximately 30% of the full operating torque $M_B$. The torque is then increased substantially linearly and constantly for an increase period $\Delta T_S$ until it reaches the full operating torque $M_B$ at the third time $t_3$. The increase is carried out using the forward and/or phase-cut off and lasts for the increase period $\Delta TS$, which here is t3−t1.

From the third time $t_3$ to the fourth time $t_4$, the full operating torque $M_B$ is present and the drive motor is operated normally, whereby it drives an associated transport section, for example, with a substantially constant DESIRED transport speed. At the fourth time $t_4$, a stop signal is generated and the drive motor is braked between the fourth time $t_4$ and the fifth time $t_5$ to 0% of the torque as the stopping torque. Braking takes place substantially linearly and constantly using the phase-cut on and/or phase-cut off. Braking is so designed that the torque is reduced in accordance with an adjustable stop function. Braking can be during an adjustable stopping period $\Delta T_A$ (here: $t_5-t_4$). The stopping period $\Delta T_A$ corresponds to the period during which the applied torque M(t) is reduced from the operating torque $M_B$ to zero. In general, the stopping period $\Delta T_A$ corresponds to the period during which the applied torque M(t) is reduced from operating torque $M_B$ to the stopping torque.

As soon as the applied torque M(t) has been reduced to zero, that is to say in the example shown at the fifth time $t_5$, a dead time $\Delta T_T$ can be started, in which renewed starting is delayed in order to avoid build up.

Figure 2B:
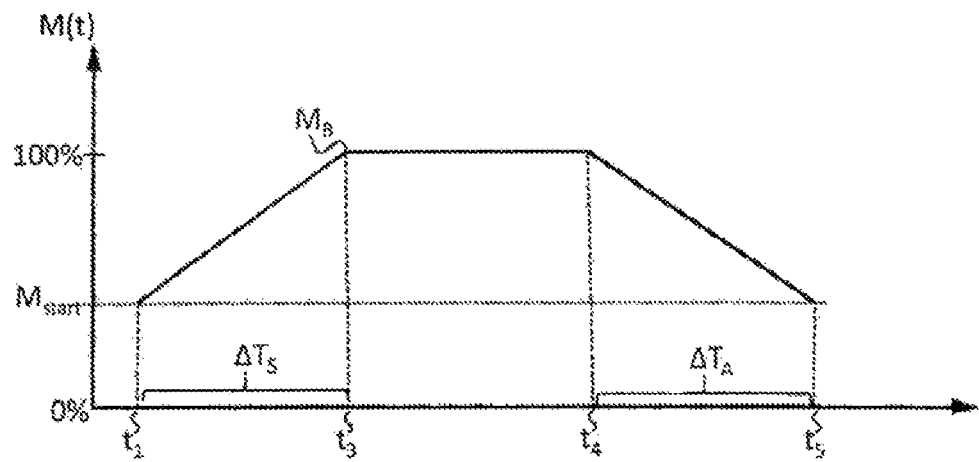

In the second exemplary embodiment, which is described with reference to the diagram shown in FIG. 2B, the drive motor is controlled exactly as in the first exemplary embodiment up to the fourth time $t_4$. At the fourth time $t_4$, a stop signal is generated and the drive motor is braked between the fourth time $t_4$ and the fifth time is to the start-up torque $M_{start}$ as the stopping torque. Here too, braking takes place substantially linearly and constantly using the phase-cut on and/or phase-cut off. In contrast to the first exemplary embodiment, however, the torque is not reduced completely to zero but to a stopping torque which is equally as large as the start-up torque $M_{start}$.

Here too, braking is so designed that the torque is reduced in accordance with an adjustable stop function. Braking can here be over an adjustable stopping period $\Delta T_A$ (here: $t_5-t_4$). The stopping torque can also be adjustable and corresponds in the second exemplary embodiment to the amount and the direction according to the start-up torque $M_{start}$.

This second exemplary embodiment has the advantage that the drive motor can be accelerated more quickly and more easily, because the stopping torque is other than zero, a bias voltage is applied to the drive motor even in the stopped transport section.

Figure 2C:
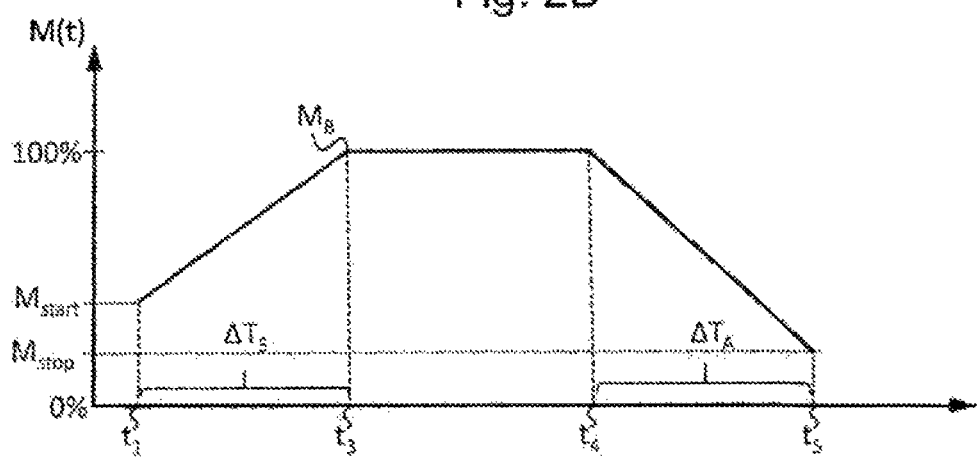

In the third exemplary embodiment, which is described with reference to the diagram shown in FIG. 2C, the drive motor is controlled exactly as in the first and second exemplary embodiment up to the fourth time $t_4$. At the fourth time $t_4$, a stop signal is generated and the drive motor is braked between the fourth time $t_4$ and the fifth time $t_5$ to the stop torque $M_{stop}$ as the stopping torque. Here too, braking takes place substantially linearly and constantly using the phase-cut on and/or phase-cut off. In contrast to the first exemplary embodiment, however, the torque is not reduced completely to zero but, as in the second exemplary embodiment, to a stopping torque other than zero. The stopping torque corresponds to the predetermined or adjustable stop torque $M_{stop}$, which is smaller than the start-up torque $M_{start}$. In particular, the stop torque $M_{stop}$ can be from approximately 20% of the start-up torque $M_{start}$ to approximately 80% of the start-up torque $M_{start}$, in particular from approximately 35% of the start-up torque $M_{start}$ to approximately 65% of the start-up torque $M_{start}$.

Here too, braking is so designed that the torque is reduced in accordance with an adjustable stop function. Braking can here be during an adjustable stopping period $\Delta T_A$ (here: $t_5-t_4$). The stopping torque can also be adjustable.

This third exemplary embodiment has the advantage, like the second exemplary embodiment, that the drive motor can be accelerated more quickly and more easily since, because the stopping torque is other than zero, a bias voltage is applied to the drive motor even in the stopped transport section. Here, however, the stopping torque is smaller than the start-up torque $M_{start}$. The likelihood of the drive motor unintentionally driving the transport section, if only at a low speed, is thus reduced.

In general, the value of the start-up torque $M_{start}$ can be selected such, that when the start-up torque $M_{start}$ is applied, the transport section is just driven, that is to say, for example, the static friction is just overcome. Therefore, the application of a stopping torque which is smaller than the start-up torque $M_{start}$ can prevent a movement of the stopped transport section.

Figure 2D:
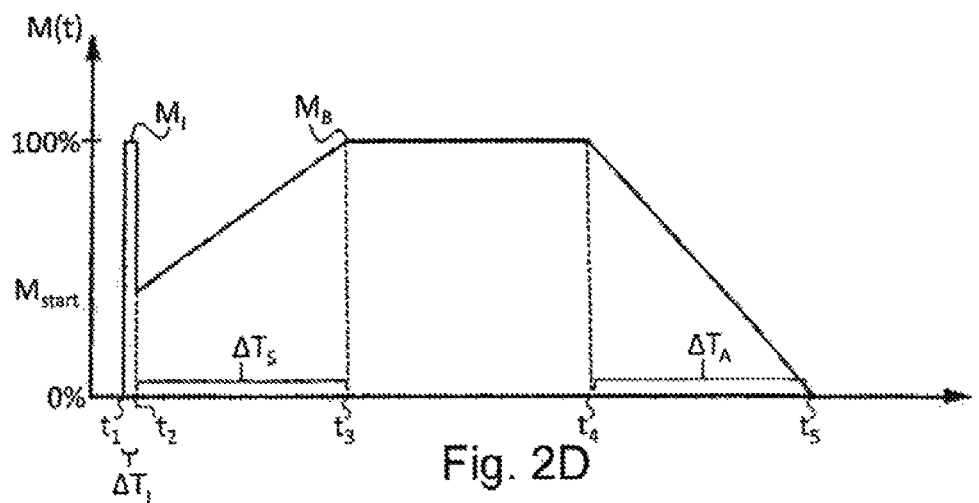

In the fourth exemplary embodiment, which is described with reference to the diagram shown in FIG. 2D, the drive motor is controlled similarly to the first exemplary embodiment. As in all the exemplary embodiments, the start signal for driving the drive motor is generated at the first time $t_1$. For a given time interval between the first time $t_1$ and a second time $t_2$, the drive motor is operated with an initial torque $M_I$. The initial torque $M_I$ corresponds to an unreduced, full torque of 100% of the operating torque $M_B$. The initial torque $M_I$ is applied for an initial period $\Delta T_I$ (here: $t_2-t_1$), until a certain impetus is achieved.

At the second time $t_2$, the torque is reduced to the start-up torque $M_{start}$, which can be, for example, approximately 30% of the full operating torque $M_B$. The drive motor is then controlled analogously to the first exemplary embodiment.

This initial torque $M_I$ can additionally be controlled not only before the first exemplary embodiment, but also additionally before the other two exemplary embodiments.

Figure 3A:
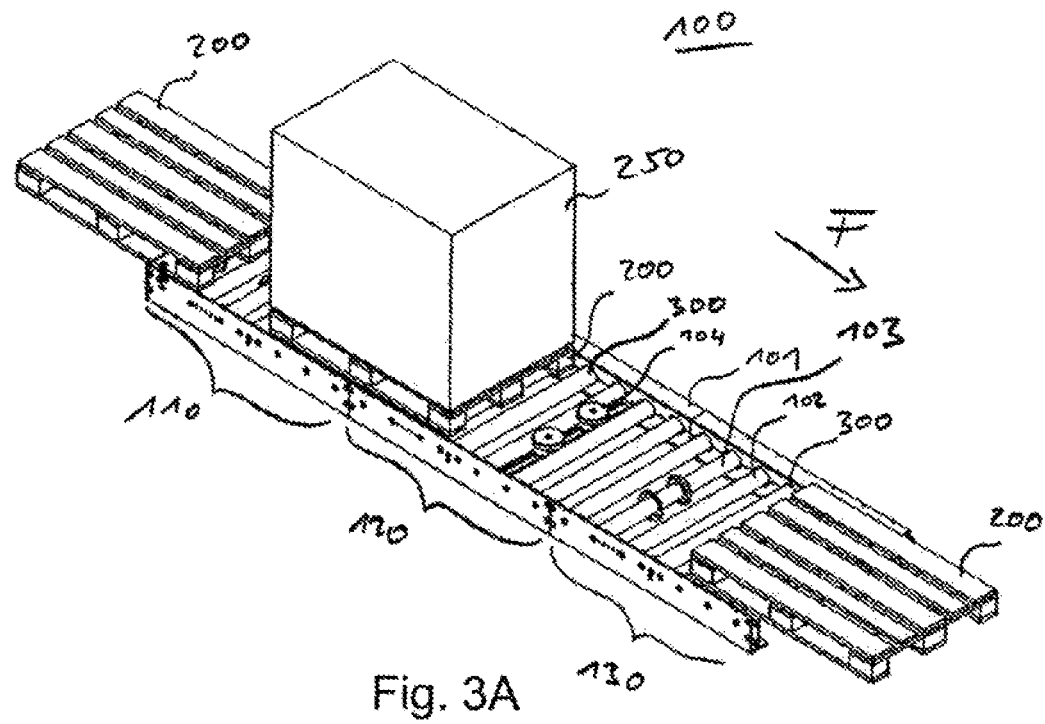
FIG. 3A shows, in a perspective view, three transport sections of a pallet conveyor.

FIG. 3A shows, in a perspective representation, a conveyor for transporting products 100, which is in the form of a pallet conveyor. The conveyor for transporting products 100 serves to convey pallets 200, of which two are shown in FIG. 3A without an additional load and a third pallet 200 is shown with a transported product 50 placed thereon.

The conveyor for transporting products 100 serves to convey the pallets 200 and/or the transported products 250 placed thereon along a transport path in and/or counter to a conveying direction F. To that end, the conveyor for transporting products 100 comprises a plurality of transport sections.

In the exemplary embodiment shown, the conveyor for transporting products 100 comprises three transport sections, namely a first transport section 110, a second transport section 120 and a third transport section 130. The three transport sections 110, 120 and 130 are arranged one behind the other in the conveying direction F and adjacent to one another, so that the pallets 200 and/or the transported products 250 arranged thereon are first conveyed along the first transport section 110, are transferred at the end of the first transport section 110 to the second transport section 120, are conveyed further thereon to the third transport section 130, and are conveyed further thereon in the conveying direction F. In the exemplary embodiment shown, the three transport sections 110, 120, 130 are configured to extend linearly. In other exemplary embodiments, the conveyor for transporting products can comprise more or fewer than three transport sections, in particular also transport sections which can convey the pallets 200 along a curve. In one exemplary embodiment, the pallets can always be delivered onto the first transport section 110 in the conveying direction F (loading zone) and thus the pallets are always accelerated from standstill. In a further exemplary embodiment, which can also be used as an alternative in combination with the previous exemplary embodiment (loading zone), the pallets are always taken from the third transport section 130 from the conveying direction F (removal zone) and thus the pallets are always braked to a standstill.

The conveyor for transporting products 100 conveys the pallets 200 along a transport path which is formed by a plurality of rollers 102 arranged parallel to one another, which rollers are fastened in a frame 101. The frame 101 provides a lateral and/or side delimitation for the transport path. The frame 101 is configured to be continuous over the individual transport sections 110, 120 and 130 and along the conveying direction F. The axes of rotation of the rollers 102 are arranged substantially perpendicularly to the conveying direction F, namely in a substantially horizontal plane. The conveying direction F is also arranged along a substantially horizontal plane, but it may also have a slight inclination. The rollers 102 are arranged in the frame 101 substantially equally spaced apart from one another. The roller coverings of the rollers 102 form a conveying line and/or transport path of the conveyor for transporting products 100.

Some of the rollers can be in the form of rollers 103 having alignment elements which serve to guide the feet of the pallets. Between the rollers there can further be arranged guide elements 104 which are likewise configured and provided for aligning the pallets 200.

Each of the transport sections 110, 120 and 130 can comprise a drive roller 300. The drive roller 300 of each transport section can be arranged substantially in the middle of the respective transport section.

Figure 3B:
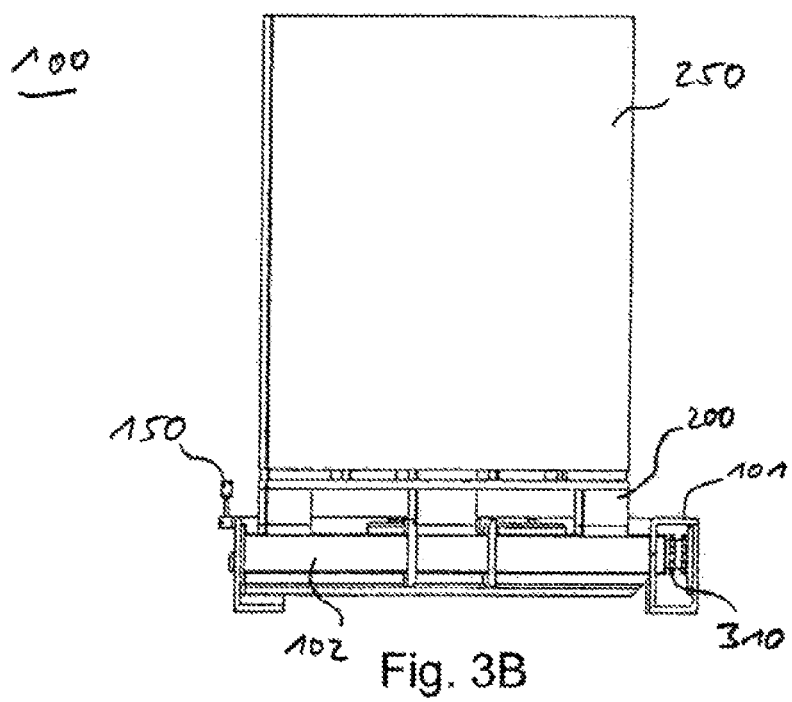
FIG. 3B shows, in a view counter to the transport direction, the three transport sections of the pallet conveyor.

FIG. 3B shows, in a view counter to the conveying direction F, the conveyor for transporting products 100 shown in FIG. 3A. It is here shown that a transmission region 310 of the drive roller 300 is arranged on one side of the frame 101. On this side, the frame 101 has a cavity into which the transmission region 310 of the drive roller 300 projects. In this transmission region 310 there can be arranged gear wheels, which transmit the driving torque of the drive roller 300 to the other rollers 102 and/or 103 of the respective transport section 110, 120 or 130. In the transmission region 310 there can be arranged coupling means such as, for example, chains, which transmit the torque of the drive roller 300 to the other rollers 102 and 103 of the transport section. Thus, when the drive roller 300 is driven, all the rollers of a transport section 110, 120 and/or 130 are driven.

At the side of the frame 101 there is arranged a detector 150, which can be in the form of a light barrier, for example. The detector 150 can detect whether a pallet 200 and/or a transported product 250 is arranged at the respective detector position. This can serve to detect and/or check whether the respective transport section 110, 120 and/or 130 is occupied or not. The detection result of the detector 150 can serve for determining start times and stop times for one of the transport sections, for example for the preceding transport section in the conveying direction F.

The conveyor for transporting products 100 can be operated in stop-and-go mode. This means that a transport section 110, 120 and/or 130 is stopped, that is to say the associated drive roller 300 is no longer driven, as long as the following transport section in the conveying direction F is still occupied by a pallet 200 and/or a transported product 250. The detector 150 can directly or indirectly (as, for example, by means of evaluation of the detection data in a processor) generate and provide detection signals which contain stop times and/or start times for the pallets 200 and/or transported products 250, namely in dependence on the detected occupancy of the transport path at the position of the detector 150.

FIG. 3C shows the conveyor for transporting products 100 in the same loading situation in which it is also shown in FIG. 3A and FIG. 3B. It is here shown that all three transport sections 110, 120 and 130 are of substantially equal length (in the conveying direction F) and they each have exactly one drive roller 300 which is arranged in the respective transport section substantially centrally in the conveying direction F.

FIG. 4 shows, in a view from above, the conveyor for transporting products 100 without pallets and without transported products 250. It is here shown that the transport sections 110, 120 and 130 do not all have to be identical. Instead, the individual transport sections can be configured individually and differently.

Thus, in the exemplary embodiment shown, the first transport section 110 comprises three rollers with alignment elements 103, namely upstream and downstream next to the drive roller 300. The second transport section 120 comprises two guide elements 104, which are arranged between the rollers 102 of the second transport section 102, namely substantially symmetrically relative to the drive roller 300. The third transport section 130 comprises, apart from the drive roller 300, only normal rollers 102 without guide elements and/or alignment elements. In the exemplary embodiment shown, all the transport sections comprise the same number of rollers, namely in each case three rollers 103 or 102 on the left and right (actually downstream and upstream when considered in the conveying direction F), in addition to the central drive roller 300. In alternative embodiments, the transport sections can comprise a different number of rollers and have different combinations of rollers 102, 103 and guide elements 104.

Figure 5:
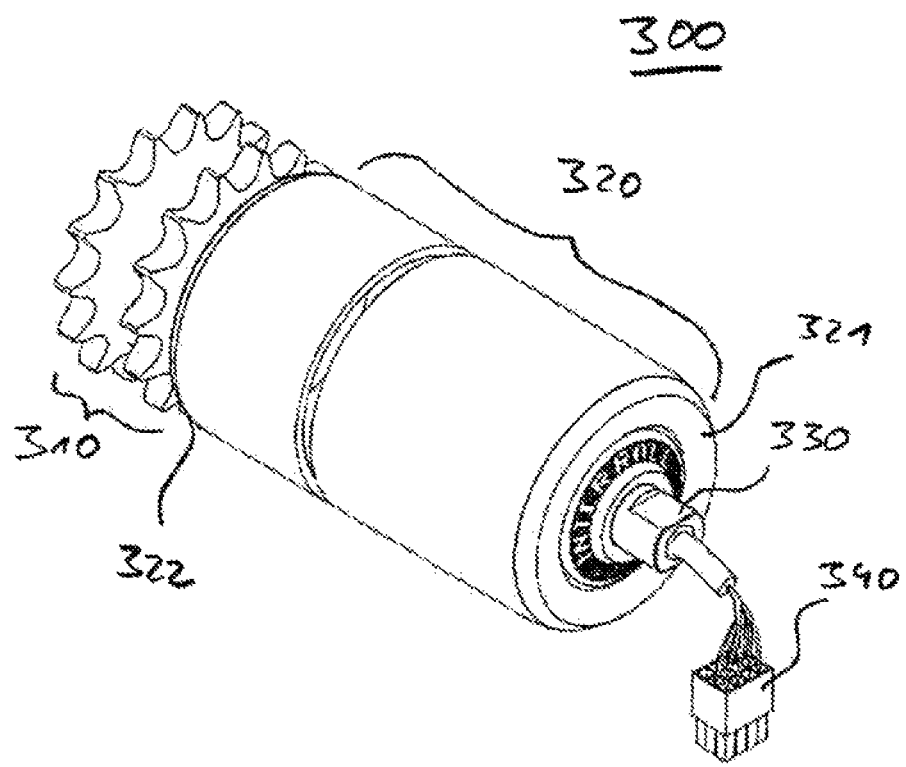
FIG. 5 shows, in a perspective view, a drive roller of a transport section of a pallet conveyor.

FIG. 5 shows, in a perspective view, the drive roller 300, which is shown shortened. This is marked in the representation shown by an omission slot, which marks a shortening of the drive roller 300. The drive roller 300 comprises a roller covering 320, which delimits the drive roller 300 radially as a cylindrical jacket. At a first roller covering end 321, a stationary shaft 330 protrudes from the drive roller 300 by a short section, that is to say as a shaft stub. The shaft stub of the stationary shaft 300 can have been and/or be permanently fixed in the frame 101 of the conveyor for transporting products 100. Electrical connections 340 protrude from the stationary shaft 300 at this end, via which electrical connections the drive roller 300 can be connected to a control device. The control device will be described in greater detail hereinbelow with reference to FIG. 7. At the opposite roller covering end, the second roller covering end 322, there is arranged the transmission region 310 of the drive roller 300. The first roller covering end 321 and the second roller covering end 322 are arranged spaced apart from one another over the entire conveying width perpendicular to the conveying direction F (in a substantially horizontal direction).

Figure 6:
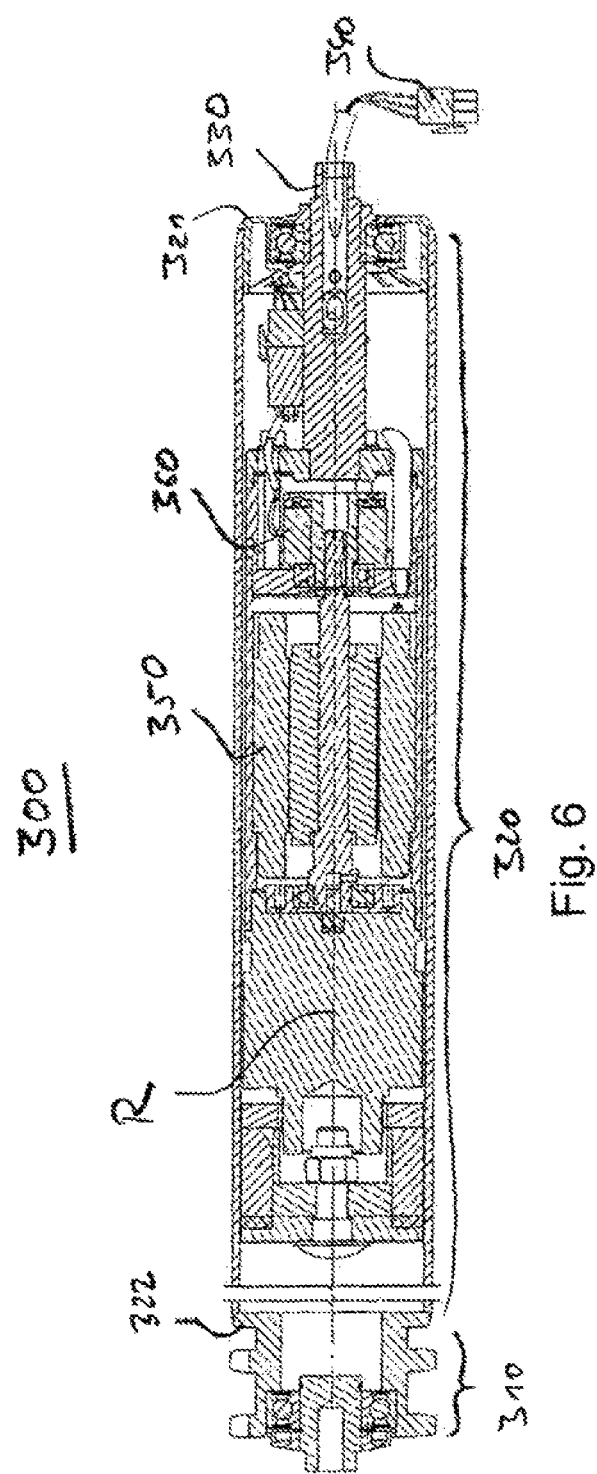
FIG. 6 shows, in a sectional view, a drive roller of a transport section of a pallet conveyor

FIG. 6 shows a cross-section through the drive roller 300. The cross-section shown in FIG. 6 is also shown shortened, which is marked by the break on the left-hand side of the roller covering 320. At the first roller covering end 321, the roller covering 320 is rotatably mounted about the stationary shaft 330 by way of a bearing, for example a ball bearing. Rotation of the roller covering can be brought about by a drive motor 350, which can be in the form of, for example, a drum motor, asynchronous motor and/or in the form of a squirrel-cage rotor.

The drive motor 350 can be fixed to the stationary shaft 330 or to a prolongation of the stationary shaft 330. The drive motor 350 can effect rotation of the roller covering 320 about the axis of rotation R and about the stationary shaft 330. The drive motor 350 thereby drives not only the roller covering 320 but also the transmission region 310, which is likewise rotatably mounted at an opposite end of the stationary shaft 330 by way of a bearing. The stationary shaft 330 can be formed continuously or in sections through the entire roller covering 320.

Gear wheels, in particular two gear wheels, can be formed at the transmission region 310. One of the gear wheels can be connected with the other rollers 102 of the respective transport section 110, 120 or 130 which are arranged upstream of the drive roller 300, and the other can be connected to the rollers that are arranged downstream of the drive roller 300. It is also possible for only the immediately adjacent roller 102 or 103 to be connected to the drive roller 300 via the gear wheels. These can in turn be connected to the rollers 102 or 103 adjacent thereto, etc. In other words, the torque of the drive roller 300 can be used to drive and/or stop all the rollers 300, 102 and 103 of the associated transport section 110, 120 or 130.

Adjacent to the drive motor 350, a holding brake 360 is arranged on the stationary shaft 330. The holding brake brakes a rotation of the roller covering 320 about the axis of rotation R, as long as the holding brake 360 is not powered. In the unpowered state, the holding brake 360 thus develops and/or effects a braking action. If the drive roller 300 is to be driven, a release current can be sent through the holding brake 360, which reduces and/or removes the braking action of the holding brake 360. A magnetic friction coupling or the like can thereby be released or similar, for example.

The powering, control and/or regulation of the holding brake 360 and of the drive motor 350 can be transmitted into and/or out of the drive roller 300 via the electrical connections 340.

The holding brake 360 is so arranged adjacent to the drive motor 350 that the holding brake 360 has substantially the same operating temperature as the drive motor 350. By measuring the electrical resistance of the holding brake 360, conclusions can be made about the operating temperature of the drive motor 350. In other words, the holding brake 360 can serve and/or be used as a temperature sensor for the operating temperature of the drive motor 350.

Figure 7:
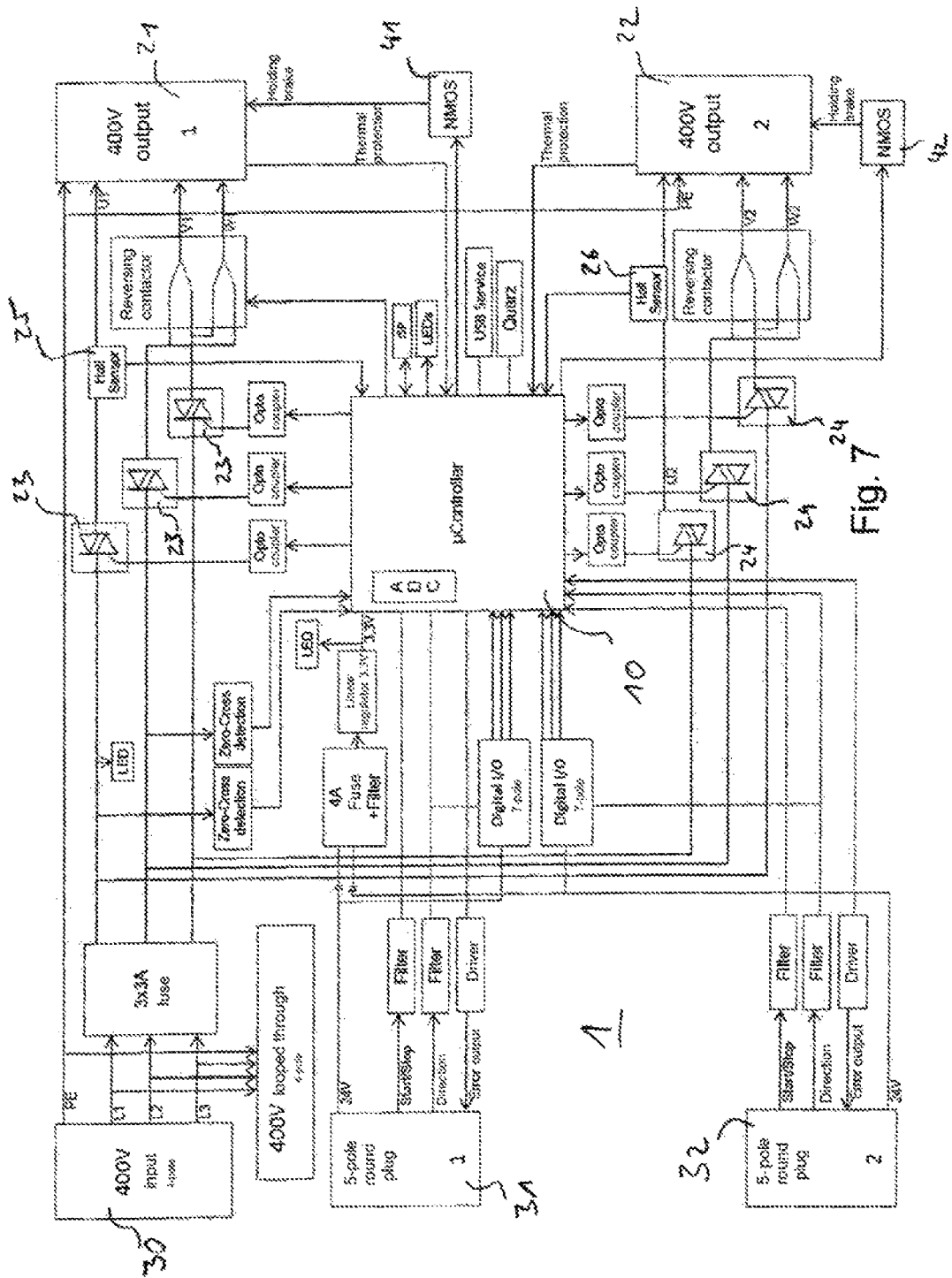
FIG. 7 shows, in a schematic block diagram, a control device for controlling a drive motor of a transport section of a conveyor for transporting products.

FIG. 7 shows, in a schematic block diagram, a control device 1 for controlling two drive motors 350 of two drive rollers 300 of the conveyor for transporting products 100.

The control device 1 can comprise a housing in which a microcontroller 10 as the processor is arranged as a central element. The processor 10 controls and/or regulates a plurality of signals and/or supply voltages. In the embodiment shown, the control device 1 has three inputs, namely a supply input 30, a first signal input 31 and a second signal input 32. At the supply input 30, three phases of a 400 V supply voltage can be provided, which have been provided via fuses as supply voltage. The processor 10 can control via opto-controllers a plurality of TRIACS 23 and 24, which control and/or regulate the application of the three phases at two outputs 21 and 22 of the control device. TRIAC here stands for "triode for alternating current". The three phases of the supply voltage which are provided via the supply input 30 are provided as control signals both at a first control output 21 and via a second control output 22.

At the first signal input 31 there can be present on the one hand a 24 V supply voltage, and on the other hand start and stop signals for the drive roller 300 of a transport section 110, 120 and/or 130 of the conveyor for transporting products 100. Furthermore, information about the direction or error messages can also be inputted and outputted via the first signal input. At the second signal input 32 too, start and stop times can be inputted and/or outputted to the microcontroller and/or the direction error signals. Here too, a supply voltage, not shown, can be provided. In the exemplary embodiment shown, a 24 V direct supply voltage is provided via the first signal input 31. This comparatively low voltage can be used to control and/or regulate various functions, in particular for operating the processor 10 and for controlling the holding brakes 360 of the two drive rollers 300.

In dependence on the received start and stop signals, in particular on the start times and/or stop times, the processor 10 processes the phases of the supply voltage which is provided at the supply input 30 to control signals for the holding brake 360 and the drive motor 350 of two driver rollers 300. The processor 10 controls the TRIACs 23 for the first control output 21, via the opto-controllers, in such a manner that the start and stop ramp of the torque shown in FIG. 2 is controlled. The TRIACs 23 can thereby be controlled in such a way that the torque M(t) of the drive motor 350 reaches both the initial torque $M_I$ used to overcome the static friction and the desired torque and/or operating torque $M_B$. In addition, the processor 10 is configured to control and/or regulate the effective torque M(t) in the increase period $\Delta T_S$ and in the stopping period $\Delta T_A$.

The same applies for the TRIACs 24 for the second control output 22.

In the case of an NMOS (abbreviation for n-type metal-oxide semiconductor) 41 or 42, the processor 10 can control and/or regulate the respective holding brake 360 of the respective drive roller 300 in such a manner that it develops or does not develop a braking action. Via the NMOS 41 and/or 42, the processor 10 can further detect the current electrical resistance of the holding brake 360 and thereby draw conclusions about the operating temperature of the drive motor 350. The operating temperature of the drive motor 350 can constitute a detected process parameter, or part of process data processed by the processor 10. As further detected process data, the processor 10 can process the weight of the transported product 250 currently being transported along the respective transport section 110, 120 and/or 130. The transported product weight can in particular be determined on start-up, namely in dependence on the power required to accelerate the transported product 250 to its desired speed (until the operating torque $M_B$ is reached). The required power during the increase period $\Delta T_S$ can in particular be used. The power can be detected, for example, via Hall sensors 25 or 26. The control device 1 can transmit the process data relating to the transported product weight to a control device, for example of the same construction, of a next and/or following transport section, so that each control device 1 is always provided with the transported product weight of the transported product 250 currently being transported thereon.

The processor 10 is configured to adjust the stop function, or switch-off ramp, when stopping the transported product in dependence on the detected process data. To that end, the stop function is adjustable. In particular, the stop function can be parameterizable. The trailing distance of the pallet 200 or of the transported product 250 can depend on many factors and/or process data. The trailing distance depends in particular on the operating temperature of the drive motor 350. Thus, the trailing distance is shorter at a low temperature than at a higher operating temperature. Furthermore, the trailing distance can depend on the transported product weight of the transported product 50, since heavy transported products have a longer trailing distance compared to lighter transported products.

In principle, the processor 10 can be configured such that it implements a standardized or pre-set trailing distance and/or stopping distance, corresponding to a pre-set stopping period $\text{Ä}T_A$. The difference in the trailing distance between lightweight pallets, that is to say, for example, pallets weighing approximately 20 kg, and heavy pallets 200, that is to say, for example, pallets weighing approximately 1250 kg, can be approximately 40 mm, for example, in one embodiment. The difference in the trailing distance at an operating temperature of 10° C., that is to say with a cold drive motor, and at an operating temperature of approximately 80° C., that is to say with a warm drive motor, is even greater and in one embodiment can be, for example, approximately 110 mm.

In order to keep the trailing distance within a comparatively narrow range when stopping the pallets 200 and/or the transported products 250, and/or to limit it to such a range, detected, current process data are taken into consideration by the processor 10 which adjusts and/or selects the stop function. The processor 10 can use, for example, parameters and/or factors which are shown by way of example in the table shown below. It should be noted that only examples of the parameters and factors are shown in Table 1. The exact or actual parameters and/or factors can be determined prior to operation and then stored in a memory means of the control device 1.

TABLE 1

| Operating temperature [° C.] | Temperature deviation [ÄK] | Factor [0.1 ms/ Kelvin] | Original parameter value stopping period [ms] | Corrected parameter value stopping period [ms] |
|---|---|---|---|---|
| 20 | −5 | −100 | 1000 | 1050 |
| 25 | 0 | −100 | 1000 | 1000 |
| 50 | 25 | −100 | 1000 | 750 |
| 65 | 40 | −100 | 1000 | 600 |
| 75 | 50 | −100 | 1000 | 500 |
| 80 | 55 | −100 | 1000 | 450 |

Table 1 gives factors and parameters for an operating temperature (shown in the first column) of the drive motor from 20° C. to 80° C. In a second column, a temperature deviation in Kelvin from room temperature of 25° C. is given. The temperature deviation is calculated from the difference between the estimated operating temperature of the drive motor 350 and room temperature of 25° C.

In the third column of Table 1, a factor in 0.1 ms/K is given. This factor is given as −100 for all values. These factors are to be understood as being only examples. In an actual transport section of a conveyor for transporting products, these factors can deviate from −100. In addition, different factors can apply and/or be used for each and/or some of the operating temperatures (that is to say for the individual rows). The factors can be measured during operation, namely on the basis of some pallets and/or transported products which are transported by way of example along the respective transport section and are brought to a stop on the respective transport section.

In the fourth column of Table 1, an original parameter value for the stopping time in ms is given. The stopping time is indicated schematically in FIG. 2 as $\Delta T_A$ and determines the stopping period (here 1000 ms) during which the torque M(t) of the drive motor 350 is reduced from the operating torque $M_B$ to the stopping torque. The reduction takes place by means of the stop function, which in the exemplary embodiment shown is a linear, monotonically decreasing and constant function. The stop function can also be referred to as a stop ramp and/or ramp down function. The original parameter value gives the stopping time in ms at an operating temperature equal to room temperature of the drive motor 350.

By multiplying the temperature deviation (column 2) with the respective factor (column 3) of the respective operating temperature (column 1), the processor 10 determines a corrected parameter value for the stopping time $\Delta T_A$ in ms, which is indicated in the fifth column of the table. Thus, the stopping period is increased at lower temperatures and shortened at higher temperatures, for example to 450 ms.

By adjusting the stop function, here in particular the stopping period $\Delta T_A$, when stopping the respective transport section 110, 120 or 130, the trailing time of the pallet 200 or of the transported product 250 is limited. A positioning of the individual transported products 250 conveyed along the conveyor for transporting products 100 can thus be improved, in particular made more accurate.

The processor 10 can be configured and/or programmed such that negative corrected parameter values for the stopping period $\Delta T_A$ are zeroized, that is to say increased.

It has been found that the operating temperature of the drive motor 350 plays a deciding role in the trailing distance of the conveyed transported product 250. The processor can use the estimated temperature of the drive motor 350 instead of the exactly measured and/or detected operating temperature of the drive motor 350. This approximate and/or estimated operating temperature can be determined by means of the holding brake 360. Since it is difficult to measure the winding resistance immediately and directly between the individual phases in the drive motor 350, the operating temperature of the holding brake 360 can be measured.

In one exemplary embodiment, the operating temperature of the drive motor 350 can be measured directly, for example using an additional relay, which is cut off from the 400 V. However, this is quite laborious and requires a higher effort in terms of components.

Instead of the immediately and/or directly measured operating temperature, an estimated operating temperature can be used as detected process data, which is determined by means of the holding brake 360. Commercial holding brakes can be operated, for example, at 24 V. The current required to operate the 24 V holding brake changes with the operating temperature of the holding brake 360. The electrical resistance of the holding brake 360 can thus be determined by means of Ohm's law, by measuring the required current. The electrical resistance of the holding brake is temperature-dependent. The operating temperature of the holding brake 360 corresponds substantially to the operating temperature of the drive motor 350, since they are in heat exchange via the components inside the drive roller 300.

The control device 1 can additionally be configured to apply a countercurrent flow as control signals to the drive motors 350 when stopping the goods and/or transported products 250. This can be expedient in particular when the drive roller does not have a holding brake and/or does not have another temperature sensor via which the operating temperature of the drive motor 350 can be detected and/or estimated. In this case, the processor 10 can apply a countercurrent flow to the drive motor 350 in order to stop to transported product 250 as directly as possible. The time interval and/or the time period of the countercurrent flow or of the countercurrent flow pulse can be a further adjustable parameter of the stop function.

The control device can comprise thermal protection for each driven drive motor 350. Furthermore, the control device 1 can comprise a USB connection for software updates and/or for programming the processor 10. The control device can further comprise LEDs for indicating whether there is an error or which connections of the control device 1 are occupied.

The control device 1 can in particular be configured to evaluate and/or provide the control signals several times per second, in particular at 1000 Hz. From the signals currently provided at the processor 10, the processor 10 can generate a current desired speed and/or desired direction of the respective transport section 110, 120, 130 that is being controlled.

When controlling the stop function, the processor can be configured such that the stop function is not a smooth, continuous stop ramp as shown in FIG. 2. Instead, the processor can control the stop ramp during the stopping period $\Delta T_A$ in several stages, for example in from five to twenty different stages, which are similar to and reproduce the descending ramp shown.

LIST OF REFERENCE CHARACTERS 1 control device
10 processor
21 first control output
22 second control output
23 TRIAC for the first control output
24 TRIAC for the second control output
25 Hall sensor for the first control output
26 Hall sensor for the second control output
30 supply input
31 first signal input
32 second signal input
41 first NMOS
42 second NMOS
100 conveyor for transporting products
101 frame
102 roller
103 roller with alignment elements
104 guide element
110 first transport section
120 second transport section
130 third transport section
150 detector
200 pallet
250 transported product
300 drive roller
310 transmission region
320 roller covering
321 first roller covering end
322 second roller covering end
330 stationary shaft
340 connections
350 drive motor
360 holding brake
F conveying direction
M(t) applied torque
$M_B$ operating torque
$M_I$ initial torque
$M_{start}$ start-up torque
$M_{stop}$ stop torque
R axis of rotation
T period
$\Delta T_I$ initial period
$\Delta T_A$ stopping period
$\Delta T_S$ increase period
$\Delta T_T$ idle period
$t_1 \ldots t_5$ first to fifth time
φ start-up phase angle

The invention claimed is:

1. A control device (1) for conveyor for transporting products (100), the conveyor for transporting products (100) having a processor (10) that generates control signals for at least one drive motor (350) of a transport section (110; 120; 130) of the conveyor for transporting products (100), the motor being operable in a stop-go-mode;
   wherein
   the processor (10) is configured, when stopping the transport section (110; 120; 130) of the conveyor for transporting products (100), to control the drive motor (350) by means of a phase-cut on and/or phase-cut off in such a manner that the torque (M(t)) generated by the drive motor (350) is reduced in accordance with an adjustable stop function, and
   the processor (10) adjusts the stop function in dependence on detected process data of the transport section (110; 120; 130).

2. The control device of claim 1, wherein the stop function is a time-dependent function of the torque (M(t)) of the drive motor (350).

3. The control device of claim 2, wherein the processor (10) adjusts a stopping period ($\Delta T_A$), during which the torque (M(t)) of the drive motor (350) is reduced from an operating torque to a stopping torque, in dependence on the detected process data.

4. The control device of claim 1, wherein the detected process data include information about a current operating temperature and/or information about a transported product weight of a transported product (250) transported along the conveyor for transporting products.

5. The control device of claim 1, wherein the processor (10), when adjusting the stop function, takes into consideration, as process data, an operating temperature of the drive motor (350).

6. The control device of claim 5, wherein the processor (10) generates control signals for the drive motor (350) of a drive roller (300) of the transport section (110; 120; 130), and the operating temperature of the drive motor (350) is determined by establishing temperature-dependent electrical resistance of a holding brake (360) of the drive roller (300).

7. The control device of claim 6, wherein the holding brake (360) is adjacent to the drive motor (350) on a stationary shaft (330) of the drive roller (300).

8. The control device of claim 6, wherein the holding brake (360) is operated with a smaller operating voltage than the drive motor (350).

9. The control device of claim 1, wherein the processor (10), when adjusting the stop function, takes into consideration, as process data, a transported product weight of a transported product (250) conveyed on the conveyor for transporting products.

10. The control device of claim 1, wherein the processor (10) is configured to determine information about a transported product weight of a transported product (250) conveyed on the conveyor for transporting products from the electrical power that is required on start-up of the drive motor (350) to accelerate the transported product (250) to a desired speed.

11. The control device of claim 1, further comprising at least one sensor data input via which the processor receives at least some of the detected process data of the conveyor for transporting products (100).

12. The control device of claim 1, further comprising at least one control output (21; 22) for outputting the control signals to the at least one drive motor (350) of the conveyor for transporting products (100).

13. The control device of claim 12, further comprising a supply input (30) for a supply voltage with at least one phase, wherein the processor (10) provides the at least one phase of the supply voltage as control signal at the control output (21; 22) such that, on start-up and stopping of the drive motor (350), it is provided with a phase-cut on and/or a phase-cut off.

14. The control device of claim 13, wherein the control output (21, 22) is configured in two parts for outputting two control signals for controlling two drive motors (350) of the conveyor for transporting products (100), and wherein the processor (10) generates the two control signals from the same supply voltage that is present at the supply input (30).

15. The control device of claim 1, further comprising at least one signal input (31; 32) via which input signals can be transmitted to the processor (10), wherein the input signals include information about start times and stop times of the at least one drive motor (350);

and wherein the processor (10) is configured to generate the control signals for the at least one drive motor (350) at the transmitted start times and stop times in such a way that the drive motor (350) is started and stopped by a phase-cut on and/or phase-cut off.

16. The control device of claim 1, wherein the processor (10) generates control signals for the drive motor (350) of a pallet conveyor (100) as the conveyor for transporting products.

17. A conveyor for transporting products (100) comprising: at least one transport section (110; 120; 130) that is driven by at least one drive motor (350), and the control device (1) of claim 1, wherein the control device (1) outputs control signals generated by the processor (10) of the control device (1) to the at least one drive motor (350).

18. The conveyor for transporting products of claim 17, further comprising a temperature sensor for detecting an operating temperature of the at least one drive motor (350), wherein the temperature sensor provides information about the detected operating temperature as process data to the processor (10) of the control device (1).

19. A method for controlling a conveyor for transporting products (100), comprising:
operating at least one drive motor (350) of a transport section (110; 120; 130) of the conveyor for transporting products (100) in a stop-and-go mode;
detecting process data of the transport section (110; 120; 130) ;
controlling the at least one drive motor (350) by means of a phase-cut on and/or phase-cut off in such a way that, on stopping of the transport section (110; 120; 130) of the conveyor for transporting products (100), the torque (M(t)) generated by the drive motor (350) is reduced in accordance with an adjustable stop function; and
adjusting the stop functions in dependence on the detected process data.

* * * * *